No. 617,143. Patented Jan. 3, 1899.
E. J. CORSER.
BEARING FOR WHEELS FOR AGRICULTURAL MACHINES.
(Application filed Mar. 23, 1898.)
(No Model.)
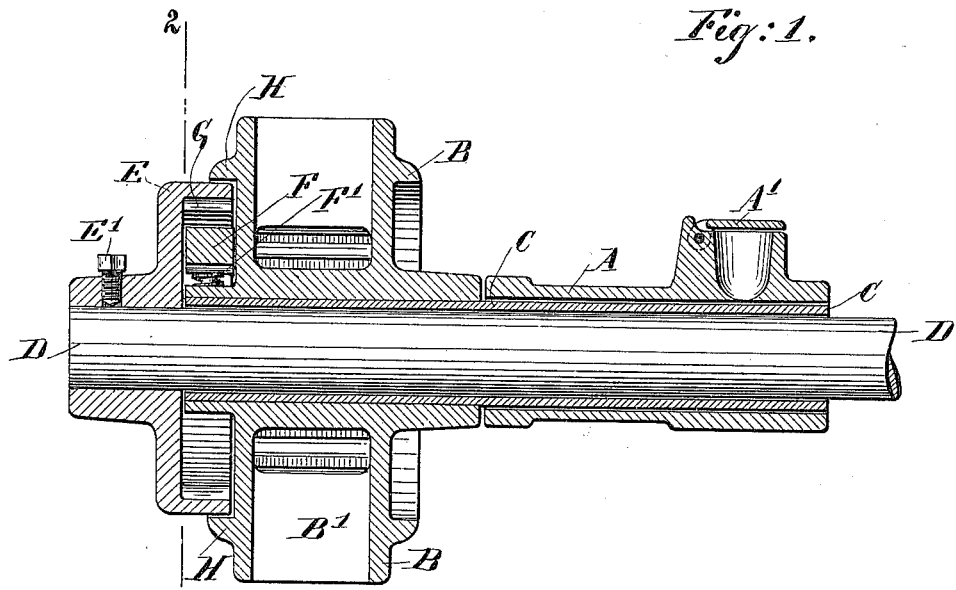
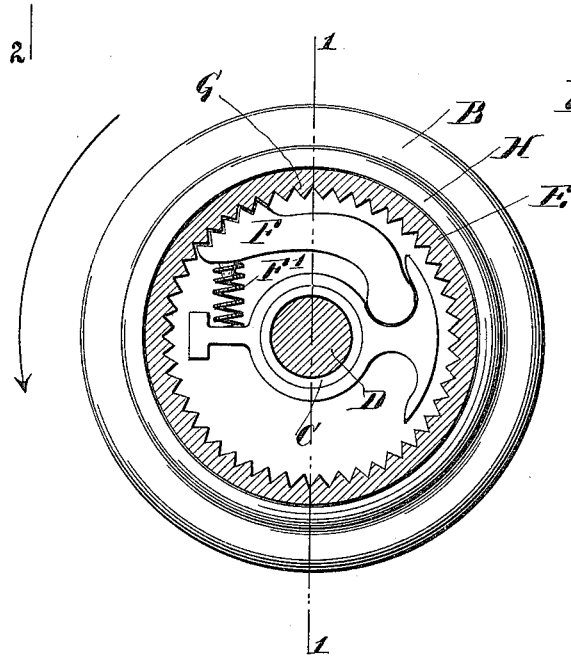
Edson Jay Corser, Inventor

UNITED STATES PATENT OFFICE.

EDSON JAY CORSER, OF MACEDON, NEW YORK, ASSIGNOR TO THE BICKFORD & HUFFMAN COMPANY, OF SAME PLACE.

BEARING FOR WHEELS FOR AGRICULTURAL MACHINES.

SPECIFICATION forming part of Letters Patent No. 617,143, dated January 3, 1899.

Application filed March 23, 1898. Serial No. 674,854. (No model.)

*To all whom it may concern:*

Be it known that I, EDSON JAY CORSER, a citizen of the United States of America, and a resident of Macedon, county of Wayne, and State of New York, have invented certain new and useful Improvements in Bearings for Wheels of Agricultural Machines and other Vehicles, of which the following is a specification.

As is well known in the art, grain-drills and other agricultural machines are frequently constructed with a main frame carrying a rotatable shaft or axle, which extends across the machine from one side to the other and supports at its outer ends the carrying or ground wheels, which support and carry the machine. This rotatable shaft or axle serves as the means for imparting motion through suitable gearing to the various operative mechanisms of the machine, the said shaft or axle receiving its motion from the carrying-wheels by suitable clutching devices. Such a mechanism as that described is presented in the United States patent to A. J. Martin, No. 376,538, dated January 17, 1888. In the said patent, however, the carrying-wheels are shown as dished or concaved—that is to say, they are inclined slightly outward from the perpendicular in order to bring the spokes which for the time being are the supporting-spokes in a substantially vertical position. It is to be noted that in connection with the devices illustrated in the present case I propose to employ a wheel which is not thus dished or concaved, but which is at all times perpendicular to the shaft or axle and in vertical position. In the employment of such a vertical wheel the chief difficulty to be overcome has been the tendency of the wheel to be inclined from its vertical position, caused by the pressure upon the wheel due to the weight of the drill and the irregularity or hilly character of the ground over which the machine is caused to pass. This difficulty arises to such an extent in some instances and the lateral pressure placed upon the wheel is so great that it very quickly produces excessive wear either in the hub of the wheel or on the axle carrying it, or on both, until the wheel is out of true, necessitating the employment of a new wheel, or, what is more serious, until the axle or shaft of the machine has been worn and cut into to such an extent that it becomes necessary to replace that as well. In order to obviate these difficulties, I propose to employ in connection with the hub of the wheel an extended cylindrical or tubular bearing, which surrounds the axle or shaft of the machine and is continued or projected into and through the axle box or bearing proper on the frame of the machine, thereby increasing the resistance of the hub to the lateral pressure on the wheel and obviating the liability to wear in the hub and on the axle in any single locality.

To these ends my invention consists in the employment of a tubular or cylindrical bearing in connection with the hub of the carrying-wheel and surrounding the shaft or axle, and also in the provision of certain other features of construction and arrangement hereinafter to be described.

Referring to the drawings, Figure 1 is a longitudinal sectional view taken substantially on the line 1 1 in Fig. 2, showing the main shaft or axle of the machine, the axle bearing or box, the hub of the carrying-wheel, and the clutching devices. Fig. 2 is a sectional view taken substantially on the line 2 2 in Fig. 1.

The general construction of the drill or agricultural implement to which my invention is applied, as shown in the drawings, is substantially that shown and described in the patent to Martin, No. 376,538, previously referred to, with the exception that, as previously stated, the carrying-wheels are designed to be at all times perpendicular to the shaft or axle and with the further differences in construction hereinafter to be pointed out.

The axle boxes or bearings A, one of which is shown in Fig. 1, are rigidly secured to the sides of the frame and are adapted to receive the shaft or axle D, which passes therethrough and is supported thereby. The axle box or bearing A is or may be of any desired construction and may be provided with oil-cups A'. The shaft or axle D, which passes through and is sustained by the axle boxes or bearings A, is similar to that shown in the patent to Martin previously referred to, and from the shaft or axle D by suitable gearing the proper and desired motions are imparted to the operative parts of the machine.

Mounted upon the shaft or axle D are the carrying or ground wheels, having the hubs B, one of which is illustrated in the drawings. As shown in Fig. 1, the hubs B are provided with the recesses or pockets B' for the reception of the wheel-spokes. The hub B is free to turn upon the axle or shaft D and imparts motion thereto through suitable clutching devices now to be described. Each of the outer ends of the axle or shaft D is provided with a hub-cap E, which is firmly secured to the shaft or axle D—as, for instance, by the screw E'—in such manner that the rotation of the hub-cap E effects similar rotation of the shaft or axle D. Rotary motion is imparted to the hub-cap E from the hub B of the carrying-wheel by suitable clutching devices, which form no part of my present invention. I have, however, shown a convenient form of effecting connection between the hub and hub-cap as follows: I provide the hub B at its outer face with a serrated pawl F, normally pressed by a spring F' into engagement with the toothed or serrated ring G, formed on the inner face of the hub-cap E and arranged in such manner that the rotation of the hub B in the direction of the arrow in Fig. 2 will cause the engagement and turning of the hub-cap E, and consequently of the shaft or axle D, whereas the rotation of the hub B in the direction opposite to that of the arrow will not effect a rotation of the hub-cap E and shaft or axle D, as the pawl F under these circumstances is permitted to move out of contact with the serrated ring G against the pressure of the spring F', all as clearly shown in Fig. 2. This form of clutching device is provided for the purpose of effecting the actuation of the shaft or axle D only while the machine is moving forwardly and to permit the machine to be backed or moved rearwardly without actuating the shaft or axle D, thereby avoiding breakage of parts. The various features which I have described up to this point may, however, be of any suitable form or arrangement, as they form no part of my present invention.

In order to provide against the displacement of the carrying-wheel and to prevent the improper and extreme wear in the hub B thereof or on the axle D, which carries the hub, I have provided the hub B with a cylindrical or tubular bearing C, surrounding the axle or shaft D and projecting from the hub into and through the axle box or bearing A. I have found a convenient mode of carrying my invention into effect in the employment of a tube or cylinder C of the proper size, which may be driven into and through the bore of the hub B and is thereby tightly held therein. This arrangement also affords a detachable connection and permits the tube or bearing C to be readily removed therefrom and a different one substituted if it should become worn or if it should be desired to employ the hub B in connection with a different shaft or axle D.

The tube or cylinder C is designed to fit the shaft or axle D closely, but nevertheless to permit of its free rotation thereon, and it will be obvious that the employment of this additional bearing tube or cylinder C distributes the pressure which is brought to bear upon the carrying-wheel over a considerably greater portion of the shaft or axle D, thereby affording a greater resistance to lateral pressure and increasing the rigidity of the wheel, as well as preventing the wearing out of the bore of the hub B and the wear upon the shaft or axle D and the cutting of grooves therein and insuring absolutely the perpendicularity between the wheel and axle.

In order to further obviate the liability to lateral displacement of the carrying-wheel and its hub B upon the shaft or axle D, I have constructed upon the outer face of the hub B an annular rim or flange H, within which the face of the hub-cap E is inserted and snugly fitted. The resistance and bearing offered to the flange H by the outer periphery of the hub-cap E still further serve to decrease the liability of the carrying-wheel and its hub B to angular displacement.

It will be obvious that if desired the tube C could be extended through the box or bearing A sufficiently to permit of its connection by clutching devices to the shaft or axle D at the inside of the box or bearing A instead of at the outside of the hub, as shown in the drawings.

Although I have shown my invention as applied to a grain-drill, it will be apparent that it may similarly be applied to other forms of agricultural machines, as well as to vehicles of all descriptions.

In practice I have found that the employment of my improved form of bearing and the arrangement of the hub-cap within the flange of the hub increase the rigidity of the carrying-wheels and prevent their angular displacement and does away with the liability to wear in the bore of the hub and upon the axle or shaft, obviating the disadvantages of loosely-fitted parts and the expense involved in their frequent replacement.

Having thus described the construction and operation of my improved devices, what I desire to claim and secure by Letters Patent of the United States is—

1. In an agricultural machine or other vehicle, the combination with the rotatable shaft or axle suitably supported in the main frame, of the hub of the carrying-wheel, the said hub being provided with a cylindrical or tubular bearing portion continued or projected from the hub proper and surrounding the shaft or axle, together with suitable clutching devices whereby the shaft or axle may be rotated from the hub of the carrying-wheel, substantially as described.

2. In an agricultural machine or other vehicle, the combination of the rotatable shaft or axle suitably supported in the main frame, the hub of the carrying-wheel mounted thereon and provided with a tubular or cylindrical bearing surrounding the axle and projected or continued from the hub proper, with the hub-cap secured to the shaft or axle, and clutching devices between the hub and hub-cap, whereby the shaft or axle may be rotated from the hub of the carrying-wheel, substantially as described.

3. In an agricultural machine or other vehicle the combination of the axle box or bearing, and the rotatable axle or shaft supported therein, with the hub of the carrying-wheel mounted upon said shaft or axle, the said hub being provided with a tubular or cylindrical bearing surrounding the shaft or axle and continued or projected from the hub into and through the axle box or bearing, together with suitable clutching devices whereby the shaft or axle may be rotated from the hub of the carrying-wheel, substantially as described.

4. In an agricultural machine or other vehicle, the combination with a rotatable shaft or axle suitably carried in the main frame, of the hub of the carrying-wheel mounted on said shaft or axle, and provided with a cylindrical or tubular bearing surrounding the axle and continued or projected from the hub proper, and of the hub-cap secured to the axle, said hub-cap fitting within and bearing upon an annular rim or flange formed upon the hub, together with suitable clutching devices between the hub and hub-cap whereby the shaft or axle may be rotated from the hub of the carrying-wheel, substantially as described.

In testimony whereof I have hereunto set my hand, in the presence of two subscribing witnesses, this 3d day of March, 1898.

EDSON JAY CORSER.

In presence of—
WAYNE GALLUP,
G. W. KIRKPATRICK.